Figure 1:
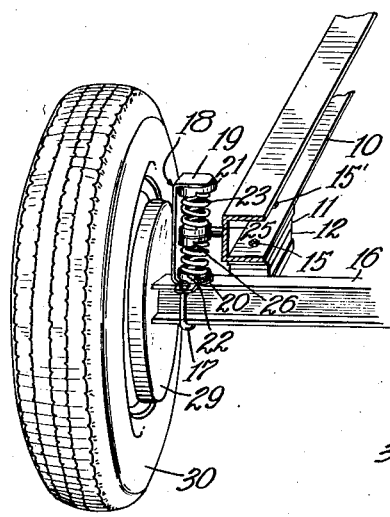

June 4, 1940.  D. PICA  2,203,392

SPRING SUSPENSION

Filed June 23, 1938  2 Sheets-Sheet 1

Inventor:
Daniel Pica
By Carl V. Wisner
Atty.

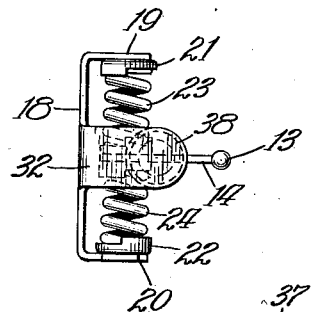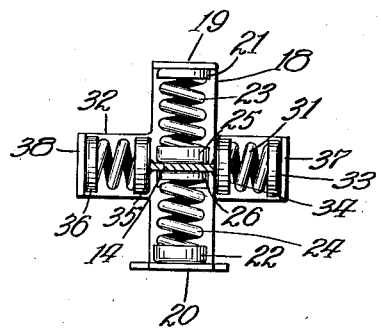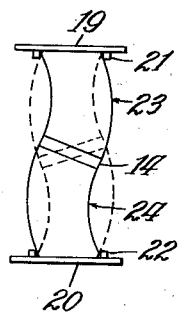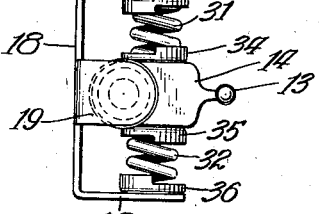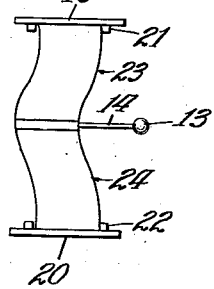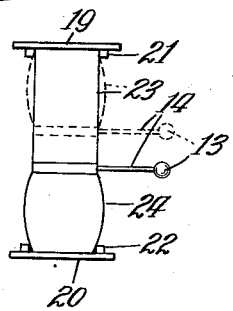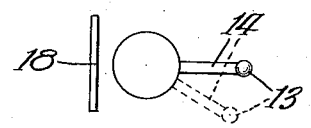

Patented June 4, 1940

2,203,392

UNITED STATES PATENT OFFICE 2,203,392

SPRING SUSPENSION

Daniel Pica, Chicago, Ill., assignor to Frank Kemptner, Chicago, Ill., as trustee Application June 23, 1938, Serial No. 215,326

11 Claims. (Cl. 267—20)

This invention has to do with spring suspension. It may be applied generally to any form of vehicular spring suspension, but it is concerned primarily with automobile spring suspension. Its uses, however, are not necessarily confined to vehicles and it may be adapted to other fields as will more particularly hereinafter appear.

This invention is directed particularly to the adaptation of coil springs to vehicular suspension. Heretofore, in automobile spring suspension, coil springs have not been found adequate and most automobile spring suspension is confined to the elliptical or semi-elliptical leaf type of spring. Where coil springs have been used, a single spring is interposed between the vehicle frame and the axle, and the weight of the body or chassis is carried directly on the top of the spring. This type of automobile spring suspension has been found undesirable by reason of the different directional stresses to which the spring is subjected. As is well known, the conventional elliptical or semi-elliptical leaf spring, particularly springs at the rear of the vehicle, are subjected to seven general classifications of stresses as follows: bending, resulting from the load; shear, resulting from the load; bending, resulting from the torque; compression, resulting from the drive; bending, resulting from a lateral thrust; and torsion, resulting from the axle roll where one wheel passes over an obstruction to which the other three wheels are not subjected. Where a coil spring is interposed directly between the frame or chassis and the axle, and is adapted to compensate for stresses only in a vertical direction, it fails completely to compensate for the stresses resulting from torque, lateral thrust, and axle roll, as well as stresses resulting from starting and braking, none of which are vertical stresses.

One object of my invention is to provide a coil spring suspension adapted to yield and cushion shocks or stresses receivable from any direction.

Another object of my invention is to provide independent suspension for each wheel of the vehicle so that each may absorb and cushion the shocks and stresses with which it alone comes in contact without affecting the frame or translating such shocks to the other wheels.

Another object of my invention is to provide a coil spring suspension for automobiles in which the spring has a relatively short length and yet is adequate to absorb whatever stresses it may be subjected to.

Another object of my invention is to provide a pair of coil springs having two yielding connections between the vehicle frame and the axle, said connections being adapted to yield in any direction. Another object of my invention is to provide a coil spring suspension for automobiles wherein the springs themselves will serve as dampeners.

Another object of my invention is to provide a coil spring suspension dispensing with any necessity of means to guide the springs or guard against their buckling when under load.

Another object of my invention is to provide a simple and cheap spring suspension structure, easy to manufacture and simple to repair, having but few parts as contrasted with spring structures commonly used in the art.

Another object of my invention is to provide a spring suspension permitting a partial rotation about a vertical axis on said spring, and providing means for attaching said spring to the vehicular frame so that the rotation of said spring is not translated to said frame.

Another object of my invention is to provide a connection between my spring suspension and the vehicle frame which is rigidly attached to said spring suspension and yieldingly attached to said frame.

With these and other objects in view, my invention is more particularly pointed out in the annexed specification and appended claims.

Figure 3:
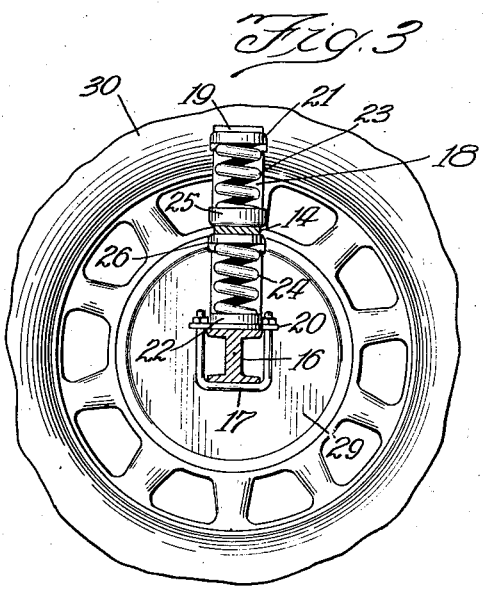
Figure 2:
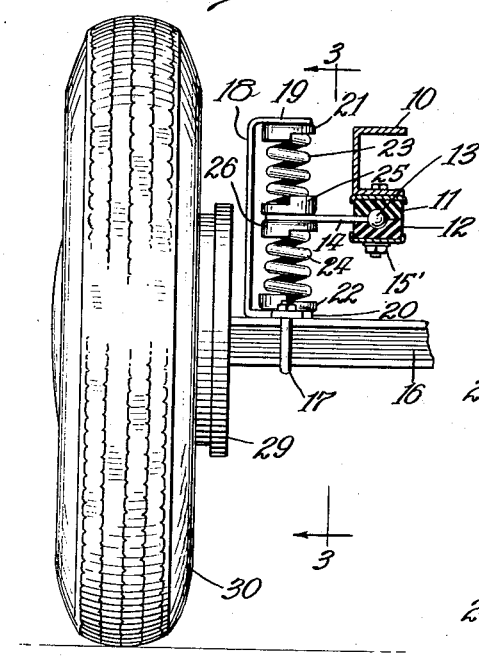
Figure 4:
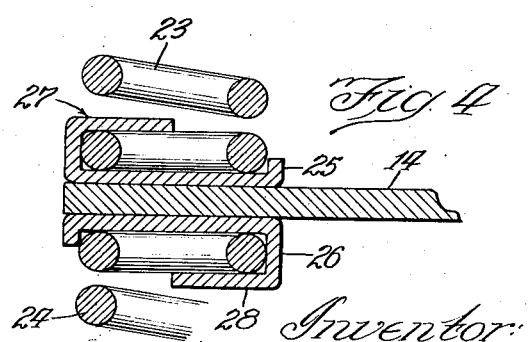

In the drawings, Fig. 1 is a perspective view with part of the frame broken away, of the left front wheel and frame assembly of an automobile, utilizing my invention. Fig. 2 is a front elevation, partly in section, of the wheel assembly shown in Fig. 1. Fig. 3 is a sectional view in part along the line 3—3 of Fig. 2. Fig. 4 is a partial sectional view greatly enlarged, showing the means whereby my springs are secured to the connecting and supporting arm. Fig. 5 is a side elevation of a modified form of my invention. Fig. 6 is a front elevation of the modified form of my invention shown in Fig. 5. Fig. 7 is a plan view of the modified form of my invention shown in Fig. 5. Figs. 8, 9, 10, 11 and 12 are a series of diagrammatic drawings, exaggerated in some respects, showing spring movement under the various stresses to which my spring suspension may be subjected.

My invention contemplates the suspension of a frame of an automobile on four pairs of coil springs, each pair disposed in series. A perspective view of the left front wheel and axle and the left front portion of the frame is shown in Fig. 1. It comprises a frame 10 resting upon and fixedly connected to a box composed of two pieces of rubber 11, 12 having a spherical cavity formed in their centers in which is seated a ball bearing 13, which is integrally cast with a supporting and connecting arm 14, as shown in Fig. 2. The rubber seating is under compression provided by a pair of bolts 15, 15', or other suitable fastening, only one of the bolts being shown in Fig. 2. Fixedly attached at the axle 16 by a yoke 17, is a bracket 18, having arms 19, 20. To the arms 19, 20 of said bracket 18 are attached seats 21, 22, for springs 23, 24, disposed in series, and at the ends of the coil springs, opposite to the seats 21, 22, are a supplementary pair of seats 25, 26 fixedly attached to the arm 14, as by welding. The seats 21, 22, 25 and 26 are provided with overlapping covers 27, 28, as is shown in Fig. 4, adapted to grip the coil springs 23, 24 firmly so that there can be no movement of the springs in the seats. It is to be understood that the coil springs are loose in the seats 21, 22, 25, 26 except for the gripping action of the covers 27, 29. A brake drum 29, and tire 30, are shown for illustrative purposes only.

While the entire chassis assembly for the four wheels is not shown, it is to be understood that the construction for the right front wheel is precisely similar to that shown in Fig. 2 heretofore described, and the construction for the rear wheel assembly differs only in mechanical details having no bearing upon my invention.

Springs 23, 24 are under substantial compression when assembled and by virtue of such compression, as is diagrammatically shown in Figs. 8, 9, 10, 11 and 12, my spring suspension is adapted to yield in any direction from which a stress may be received. For example, in Fig. 8 the solid line shows the strain resulting from torque when the clutch is thrown in for forward motion or the brake is applied in reverse. The dotted line in Fig. 8 shows the strain resulting from torque when the clutch is thrown in for reverse or when the brake is applied in running forward. The view in Fig. 8 is from the same direction as that in Fig. 3. In Fig. 9, the view being the same as that shown in Fig. 2, the reaction of my spring suspension to a lateral thrust is shown. Such a thrust results when the opposite wheel hits the curb or some similar obstruction. In Fig. 10, the simple load deflection and reaction therefrom are shown. In Fig. 11, the view being the same as Fig. 10, the strains resulting from the axle roll, which is ordinarily caused by vertical displacement of one wheel, is shown. In Fig. 12, a sectional plan view, the dotted line shows ability of my spring to take up a horizontal stress. Such a stress would result, for example, from both front wheels hitting a curb when the car is in forward motion and an opposite stress would result from both back wheels hitting the curb when the car is in reverse.

A modification of my invention is shown in Figs. 5, 6 and 7, which is directed toward counteracting to some degree stresses of the type shown diagrammatically in Fig. 12. I utilized the same pair of vertical coil springs 23, 24 heretofore described with reference to Figs. 1 to 4. In addition to the vertical springs I employ a pair of horizontally disposed coil springs 31, 32 seated in seats 33, 34 for spring 31, and seats 35, 36 for spring 32, in a manner similar to the method of seating the springs 23, 24 as is shown in Fig. 4.

In support for my horizontal springs 31, 32 a pair of arms 37, 38 are integrally cast to the bracket 18. Seat 33 for spring 31 is welded, or otherwise fixedly connected, to arm 37, and seat 36, for spring 32, is similarly attached to arm 38. Seats 34, 35 are similarly affixed to the arm 14, carrying the ball bearing 13.

It will readily be seen that the structure with the supplementary horizontal coil springs will assist the vertical coil springs in taking up the various strains shown in Figs. 8 to 12.

While I have described my invention as embodied in concrete form for purposes of illustration, it will be understood that I do not limit my invention thereto, since various modifications will suggest themselves to those skilled in the art without departing from the spirit thereof, the scope of which is set forth in the annexed claims.

I claim:

1. In a vehicular spring suspension, the combination of a pair of coil springs in series, a bracket having seats engaging opposite ends of said springs in a locked relationship, and holding said springs under pressure, an arm, one end of which is fixedly disposed between said springs, being otherwise free to move in any direction, and the other end being yieldingly connected to a vehicle frame.

2. In a vehicular spring suspension, the combination of a pair of coil springs in series, a bracket having seats engaging opposite ends of said springs in a locked relationship and holding said springs under pressure, an arm, one end of which is fixedly disposed between said springs, being otherwise free to move in any direction, and the other end being pivotally connected to a vehicle frame.

3. In a vehicular spring suspension, a pair of coil springs in series and under vertical pressure, the outer end of each of said springs being locked to an arm of a bracket, the interior ends of said springs being locked to an arm disposed therebetween, the interior ends of said springs and said arm being free to move in any direction, and said arm being yieldingly connected to a vehicle frame.

4. In a vehicular spring suspension, a pair of coil springs in series and under vertical pressure, the outer end of each of said springs being locked to an arm of a bracket, the interior ends of said springs being locked to an arm disposed therebetween, the interior ends of said springs and said arm being free to move in any direction, and said arm being pivotally connected to a vehicle frame.

5. In a vehicular spring suspension, a pair of coil springs in series, means for holding said springs under compression, the exterior ends of said springs being fixedly attached to said compression means, the interior ends of said springs being free to move in any direction, and a support for a vehicle frame fixedly disposed between the interior ends of said springs, said support connecting said springs with said frame.

6. A spring suspension assembly between an axle and a vehicle frame comprising a bracket mounted on said axle, a pair of coil springs in series held under compression by said bracket, the exterior ends of said coil springs being fixedly attached to arms of said bracket, and a supporting arm having a fixed connection to the interior ends of said springs and a yielding connection to said vehicle frame.

7. In a vehicular spring suspension, the combination of a bracket having pairs of arms at right angles to one another, a pair of coil springs in series between one of said pairs of arms about a vertical axis, a second pair of coil springs in series between the other pair of arms on said bracket about a horizontal axis, a supporting arm at right angles to the axes of each of said pairs of coil springs, said supporting arm having a fixed connection to the interior ends of each of said springs and a yielding connection to a vehicle frame.

8. In a vehicular spring suspension, the combination of a bracket having pairs of arms at right angles to one another, a pair of coil springs in series between one of said pairs of arms about a vertical axis, a second pair of coil springs in series between the other pair of arms on said bracket about a horizontal axis, a supporting arm at right angles to the axes of each of said pairs of coil springs, said supporting arm having a fixed connection to the interior ends of each of said springs and a pivotal connection to a vehicle frame.

9. In a vehicular spring suspension, the combination of a bracket having pairs of arms at right angles to one another, a pair of coil springs in series between one of said pairs of arms on said bracket about a horizontal axis, a second pair of coil springs in series between the other pair of arms on said bracket about a horizontal axis, a supporting arm at right angles to the axes of each of said pairs of coil springs, said supporting arm having a fixed connection to the interior ends of each of said springs.

10. In a vehicular spring suspension, the combination of a pair of coil springs in vertical series, held under pressure by means fixedly engaging opposite ends of said springs, and a supporting arm fixedly connected to the interior ends of said springs, and yieldingly connected to a vehicle frame, the interior ends of said springs and the end of said arm opposite said vehicle frame being free to move in any direction.

11. A spring suspension between a vehicle frame and an axle, comprising a pair of vertical coil springs in series and under pressure, and a supporting and connecting arm between said coil springs and said frame, said arm having a universal movement relative to said axle and said frame.

DANIEL PICA.